United States Patent
Shi et al.

(10) Patent No.: US 7,595,979 B2
(45) Date of Patent: Sep. 29, 2009

(54) LCD PANEL MOUNTING APPARATUS

(75) Inventors: Zheng Shi, Shenzhen (CN); Jun Zhang, Shenzhen (CN); Chien-Li Tsai, Tu-Cheng (TW); Wen-Kang Lo, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 403 days.

(21) Appl. No.: 11/309,410

(22) Filed: Aug. 4, 2006

(65) Prior Publication Data

US 2007/0090247 A1 Apr. 26, 2007

(30) Foreign Application Priority Data

Sep. 30, 2005 (CN) .................. 2005 2 0065325 U

(51) Int. Cl.
*G06F 1/16* (2006.01)
(52) U.S. Cl. ............................ 361/679.21; 361/679.22; 349/58; 248/924
(58) Field of Classification Search ................. 361/681; 349/58; 248/924
See application file for complete search history.

(56) References Cited

U.S. PATENT DOCUMENTS

| | | | | |
|---|---|---|---|---|
| 6,104,605 A * | 8/2000 | Lee | ............................ | 361/681 |
| 6,667,780 B2 * | 12/2003 | Cho | ............................ | 349/58 |
| 6,900,792 B2 * | 5/2005 | Sun et al. | ..................... | 345/156 |
| 7,002,645 B2 * | 2/2006 | Fukayama et al. | ............ | 349/58 |
| 7,006,168 B2 * | 2/2006 | Lee | .............................. | 349/58 |
| 7,178,967 B2 * | 2/2007 | Kim | ............................ | 362/633 |
| 7,270,462 B2 * | 9/2007 | Yu et al. | ..................... | 362/609 |
| 2005/0168954 A1* | 8/2005 | Kim | ......................... | 361/725 |
| 2005/0206799 A1* | 9/2005 | Li et al. | ......................... | 349/58 |
| 2006/0050196 A1* | 3/2006 | Lee | ............................. | 349/58 |
| 2006/0055839 A1* | 3/2006 | Hirao et al. | ................... | 349/58 |
| 2006/0082518 A1* | 4/2006 | Ram | ......................... | 345/1.1 |
| 2006/0171106 A1* | 8/2006 | Cho et al. | .................... | 361/681 |
| 2006/0227498 A1* | 10/2006 | Tanaka et al. | ............... | 361/681 |
| 2007/0103775 A1* | 5/2007 | Shi et al. | .................... | 359/443 |
| 2007/0253150 A1* | 11/2007 | Yue et al. | .................... | 361/681 |
| 2007/0263347 A1* | 11/2007 | Hong et al. | ................. | 361/681 |
| 2008/0019089 A1* | 1/2008 | Chi et al. | .................... | 361/681 |

* cited by examiner

*Primary Examiner*—Jayprakash N Gandhi
*Assistant Examiner*—Anthony Q Edwards
(74) *Attorney, Agent, or Firm*—Wei Te Chung

(57) ABSTRACT

An exemplary LCD panel mounting apparatus includes a bracket, a pair of frames, and a pair of actuators. The bracket includes a flange defining a pair of slots therein. The frames are slidably attached to the bracket in a first direction and each includes a first sliding member defining a pair of notches therein along the first direction. The actuators are slidably attached to the bracket in a second direction perpendicular to the first direction and each includes a post selectively engaging in one of the notches of the frames, and a handling tab extending through the corresponding slot of the bracket. The frames each include a pair of seats defining threaded holes therein to fix different size LCD panels thereon.

18 Claims, 8 Drawing Sheets

LCD PANEL MOUNTING APPARATUS

FIELD OF THE INVENTION

The present invention relates to mounting apparatus for mounting LCDs thereon, and particularly to a mounting apparatus which can be adjusted to mount different size LCD panels thereon.

DESCRIPTION OF RELATED ART

Generally, in a portable computer, including but not limited to devices such as a notebook type personal computer, a PDA apparatus and the like, a lid containing a LCD display, which serves as a display unit to display a picture, is pivotably connected to a back end of the computer body. In the conventional portable computer, the lid with a certain size holds a LCD panel with a fixed corresponding size. When users need another size display screen to fulfill different viewing requirements, the old lid must be replaced with a new one, which is costly.

What is needed, therefore, is a mounting apparatus which can adjustably receive different size LCD panels mounted thereon.

SUMMARY OF THE INVENTION

In a preferred embodiment, an LCD panel mounting apparatus includes a bracket, a pair of frames, and a pair of actuators. The bracket includes a flange defining a pair of slots therein. The frames are slidably attached to the bracket in a first direction and each includes a first sliding member defining a pair of notches therein along the first direction. The actuators are slidably attached to the bracket in a second direction perpendicular to the first direction and each includes a post selectively engaging in one of the notches of the frames, and a handling tab extending through the corresponding slot of the bracket. The frames each include a pair of seats defining threaded holes therein to fix different size LCD panels thereon.

Other objects, advantages and novel features of the present invention will become more apparent from the following detailed description of preferred embodiments when taken in conjunction with the accompanying drawings, in which:

DETAILED DESCRIPTION OF THE INVENTION

Figure 1:
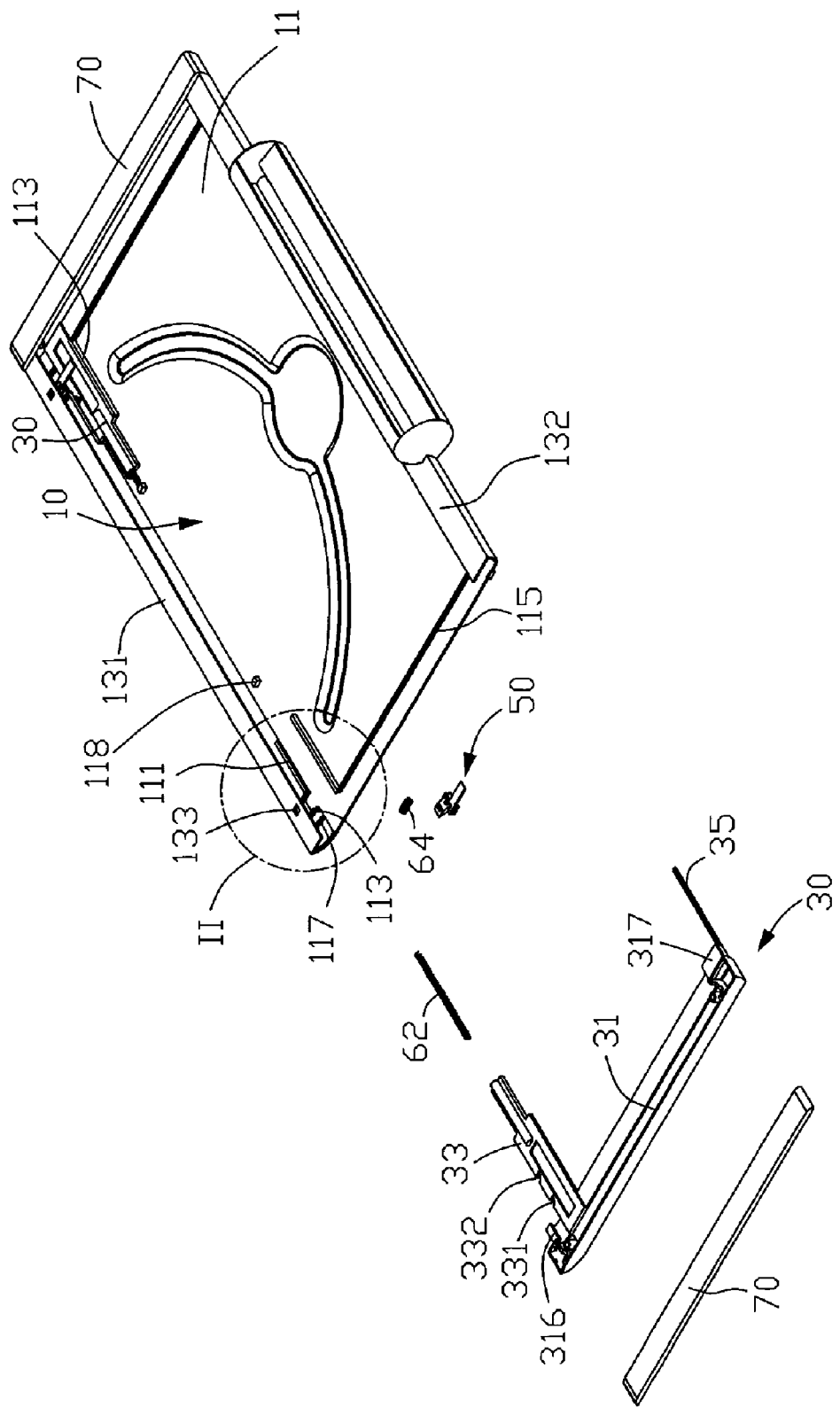
FIG. 1 is an exploded, isometric view of an LCD panel mounting apparatus in accordance with a preferred embodiment of the present invention, the mounting apparatus including frames and actuators.

Referring to FIG. 1, an LCD panel mounting apparatus in accordance with a preferred embodiment of the present invention adjustably mounts different size LCD panels thereon. In this preferred embodiment, the mounting apparatus has a symmetrical configuration, and only a left portion of the mounting apparatus, which is same as a right portion thereof, is introduced. The LCD panel mounting apparatus includes a bracket 10, a frame 30, an actuator 50, and a covering plate 70. The covering plate 70 includes a pair of hooks 72 formed at opposite ends thereof, respectively.

Figure 2:
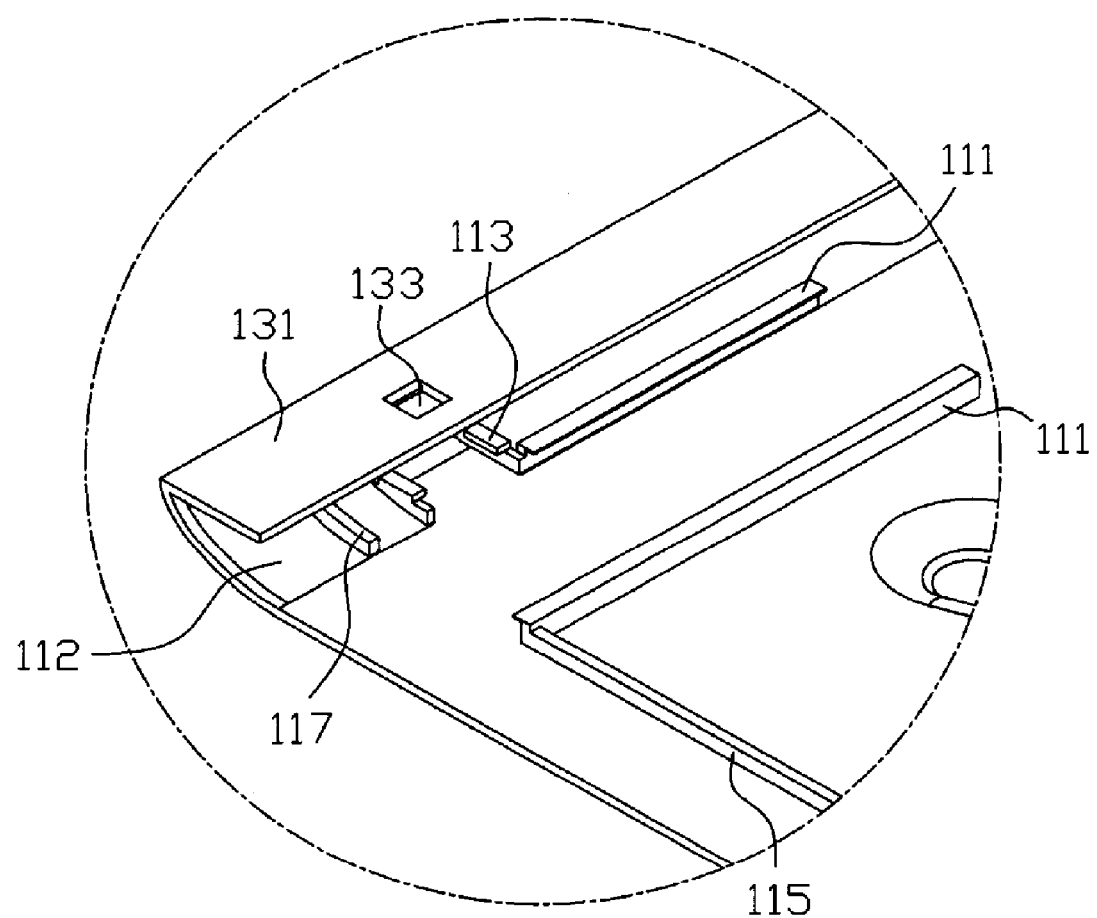
FIG. 2 is an enlarged view of a circled portion II of FIG. 1.

Referring also to FIG. 2, the bracket 10 includes a back wall 11, and a pair of flanges 131, 132 respectively extending from two opposite longwise edges of the back wall 11. The back wall 11 includes a curved portion 112 formed at a fore end portion thereof, adjacent the flange 131. A slot 133 is defined in the flange 131. A pair of first rails 111 extends longwise from the back wall 11 adjacent the flange 131. A pair of second rails 113 extends from the back wall 11 below the upper flange 131, corresponding to the slot 133 and perpendicular to the first railways 111. A first blocking bar 115 and a second blocking bar 117 generally in a line extend from the back wall 11 perpendicular to the first rails 111. The second blocking bar 117 is located below the flange 131. The back wall 11 includes a third railway (not shown) longwise defined thereon and located below the flange 132. A block 118 extends from the back wall 11 near a right end of the first rails 111.

Figure 3:
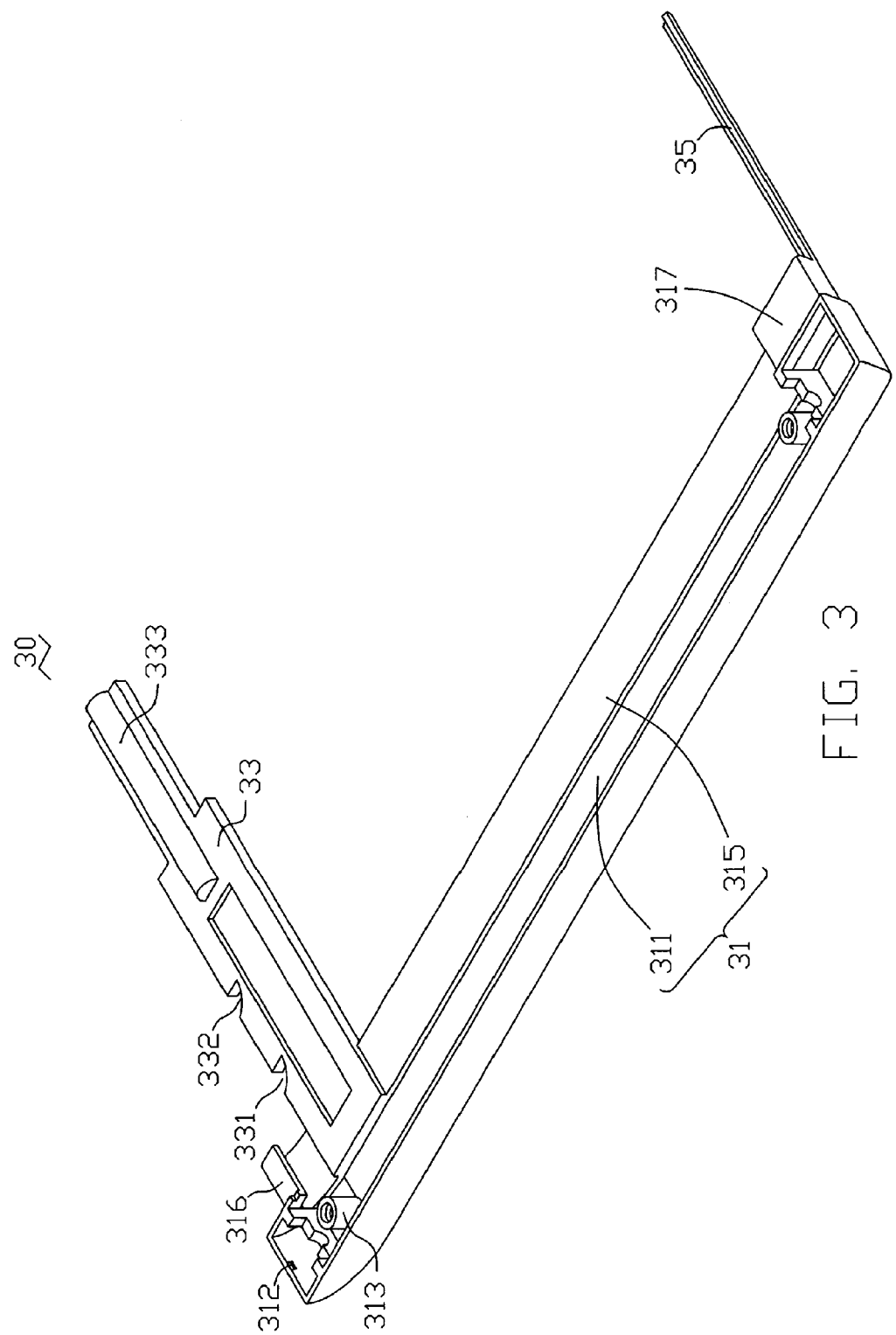
FIG. 3 is an enlarged view of the frame of FIG. 1, but viewed from another aspect.

Referring also to FIG. 3, the frame 30 includes a main body 31, a first sliding member 33, and a second sliding member 35. The main body 31 has a curved end, corresponding to the curved portion 112 of the bracket 10. The main body 31 includes a first part 311, and a second part 315 juxtaposed with the first part 311. A pair of recesses 312 is defined in two ends of the first part 311, corresponding to the hooks 72 of the covering plate 70. A pair of seats 313 defining threaded holes extends from the first part 311. The second part 315 includes a pair of hems 316, 317 extending from two ends thereof, slidably engaging with the flanges 131, 132 of the bracket 10. The first sliding member 33 is a board extending from the main body 31, corresponding to the first rails 111 of the bracket 10. A first notch 331 and a second notch 332 are defined in an edge portion of the first sliding member 33. A half cylinder 333 extends from a fore portion of the first sliding member 33, and cooperates with the first sliding member 33 to define a cylindrical shaped hole (not shown), to receive a first resilient member 62 therein. The second sliding member 35 is a pole extending from the main body 31 parallel to the first sliding member 33, corresponding to the third railway of the bracket 10.

Figure 4:
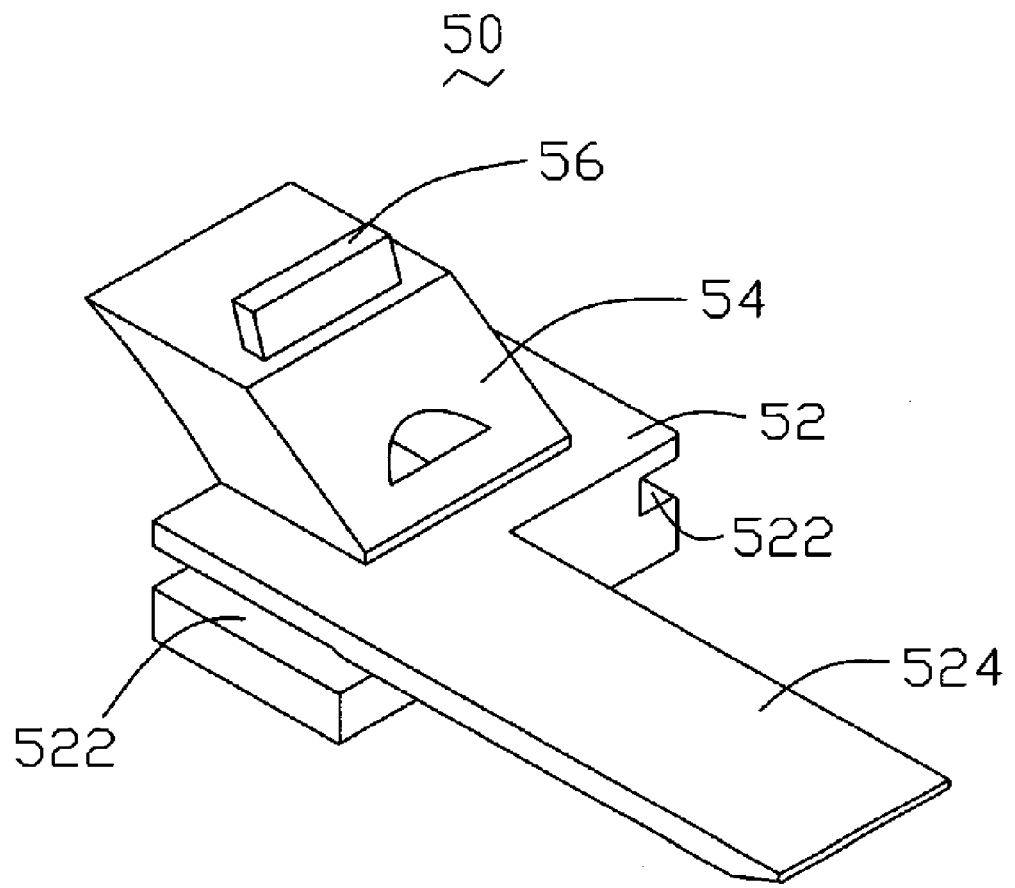
FIGS. 4 and 5 are enlarged views of the actuator of FIG. 1, but viewed in different aspects.
Figure 5:
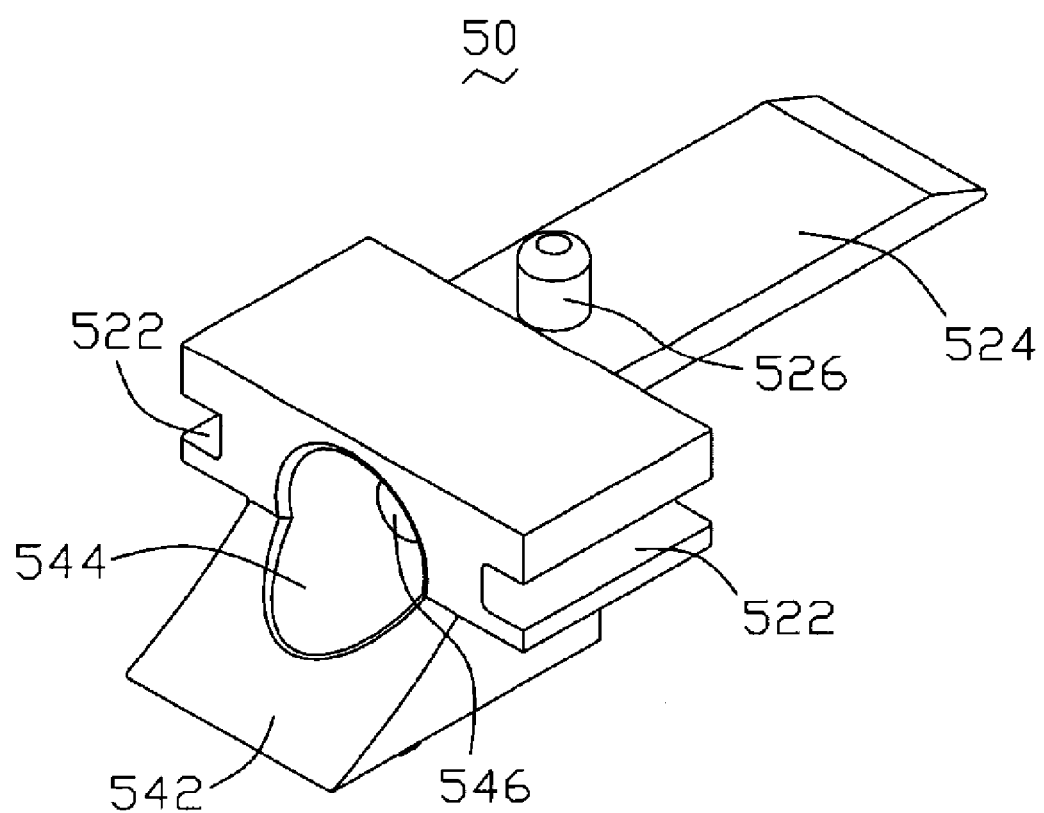

Referring to FIGS. 4 and 5, the actuator 50 includes a base 52, and a wedged block 54 standing on the base 52, and a handling tab 56 standing on the wedged block 54. The base 52 includes a pair of channels 522 defined in side portions thereof, and an extension board 524 horizontally extending from a top of the base 52. A post 526 depends from a lower surface of the extension board 524. The wedged block 54 has a sloped wall 542 formed on a rear portion thereof, corresponding to the curved portion 112 of the bracket 10. An opening 544 is defined in the sloped wall 542. A shaft 546 extends from the base 52 toward the opening 544, together with the curved portion 112 of the bracket 10 to hold a second resilient member 64 therebetween.

Figure 6:
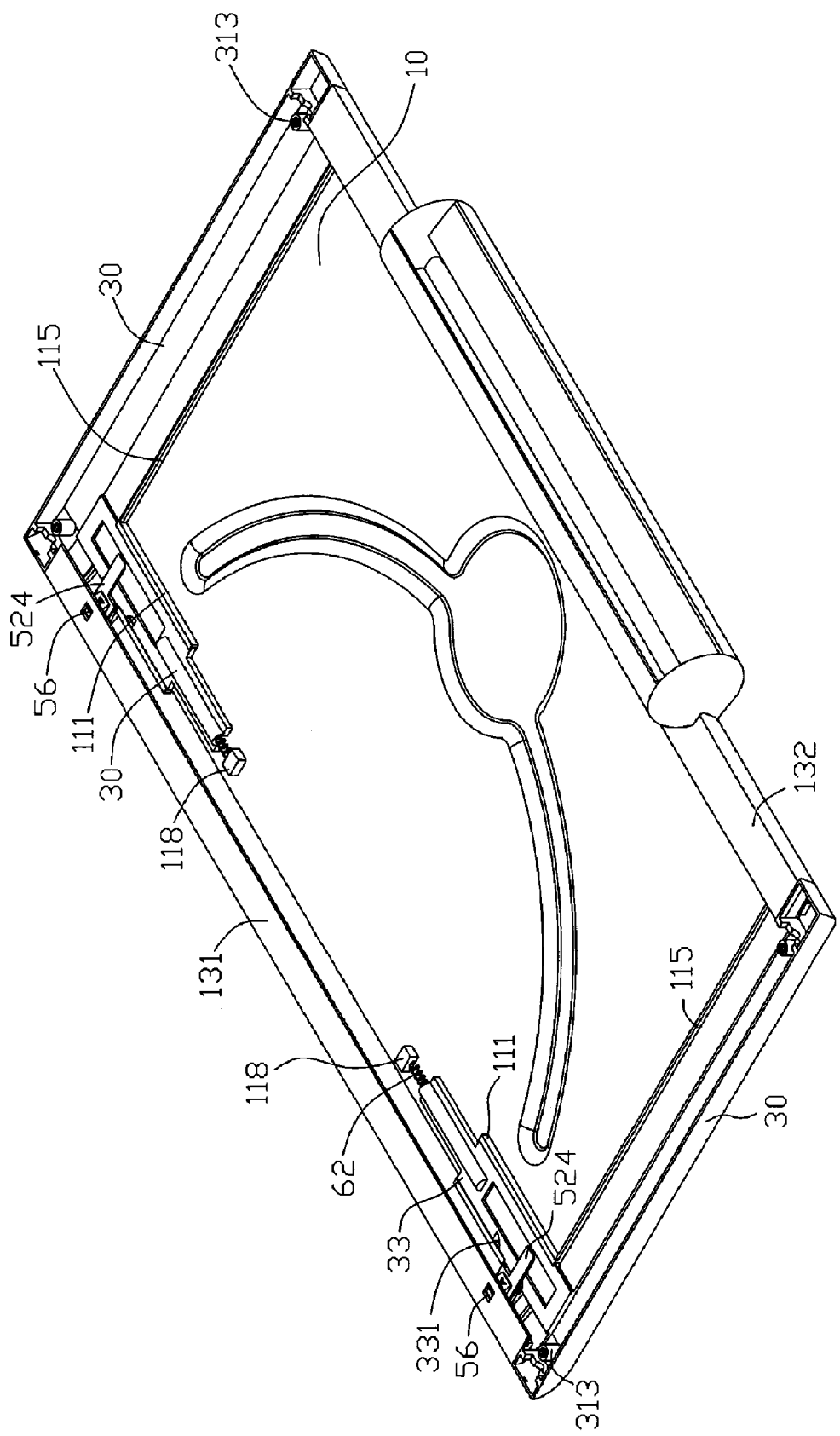
FIG. 6 is a sub-assembled view of the LCD panel mounting apparatus of FIG. 1.

Referring also to FIG. 6, in assembly, only the left portion of the mounting apparatus is introduced. The frame 30 is attached to the bracket 10, with the first sliding member 33 sliding along the first rails 111 and the second sliding member 35 sliding along the third railway. The hems 316, 317 of the frame 30 slide along lower surfaces of the flanges 131, 132 of the bracket 10, respectively. The first resilient member 62 is received in the hole of the half cylinder 333 and the first sliding member 33 of the frame 30 and movably abuts against the block 118 of the back wall 11 of the bracket 10. The frame 30 is moved rightward until a right edge of the second part 315 of the main body 31 contacts the first blocking bar 115 and the second blocking bar 117. The actuator 50 is attached to the bracket 10, with the second rails 113 slidably engaging in the channels 522 and the extension board 524 presses against the first sliding member 33 of the frame 30. The handling tab 56 extends out of the slot 133 of the first flange 131 of the bracket 10. The second resilient member 64 is fixed around the shaft 546 and through the opening 544 to movably abut against the curved portion 112 of the bracket 10. The post 526 engages in the second notch 332 of the frame 30.

Figure 7:
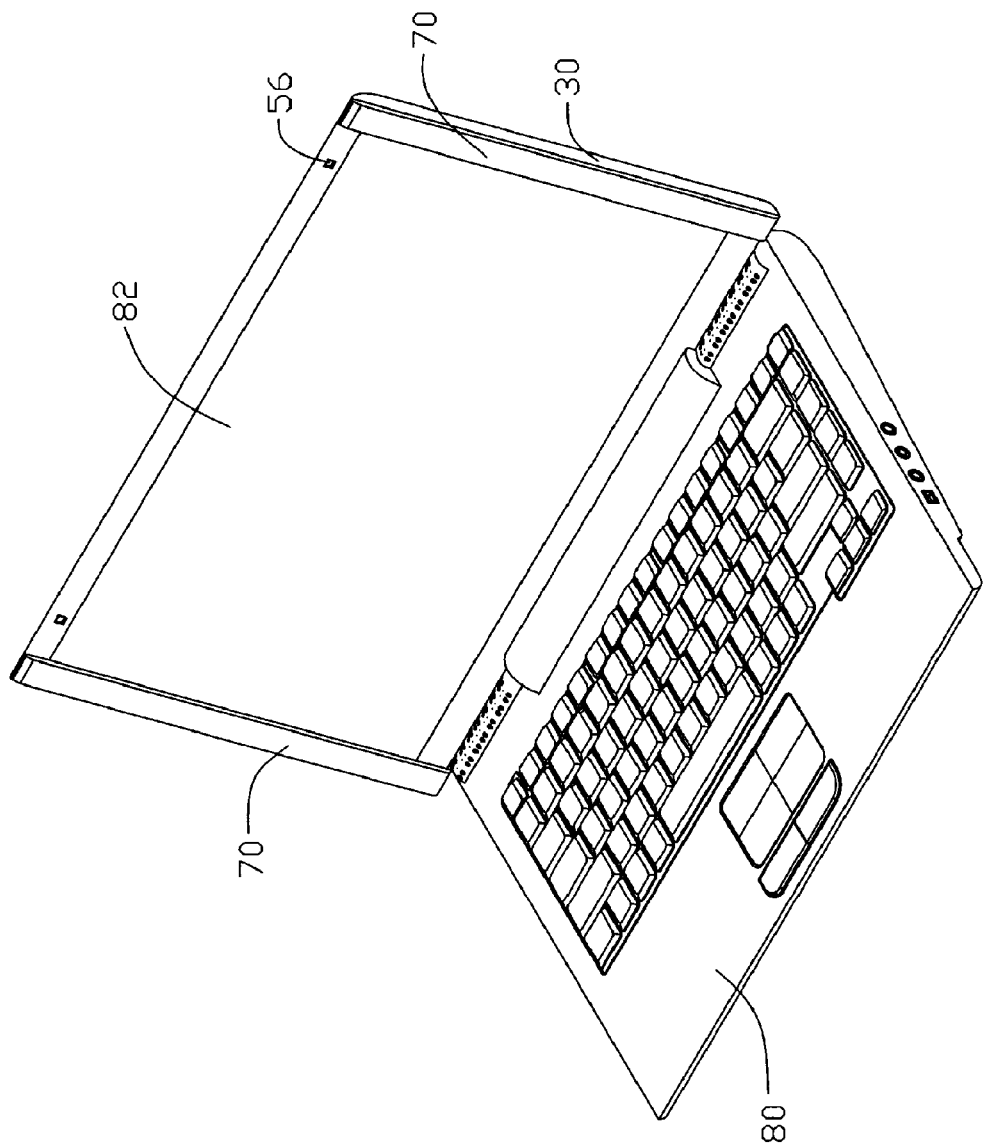
FIGS. 7 and 8 are assembled views of the LCD panel mounting apparatus mounting different size LCD panels in accordance with the preferred embodiment of the present invention of FIG. 1, together with a base of a notebook computer.

Referring also to FIG. 7, the mounting apparatus is assembled to a base member 80 of a notebook computer (not labeled). A first LCD panel 82 is attached to the mounting apparatus, with fasteners (not shown) engaging with the seats 313 of the frames 30. Then the covering plates 70 are attached to the frames 30 with the hooks 72 engaging in the recesses 312.

Figure 8:
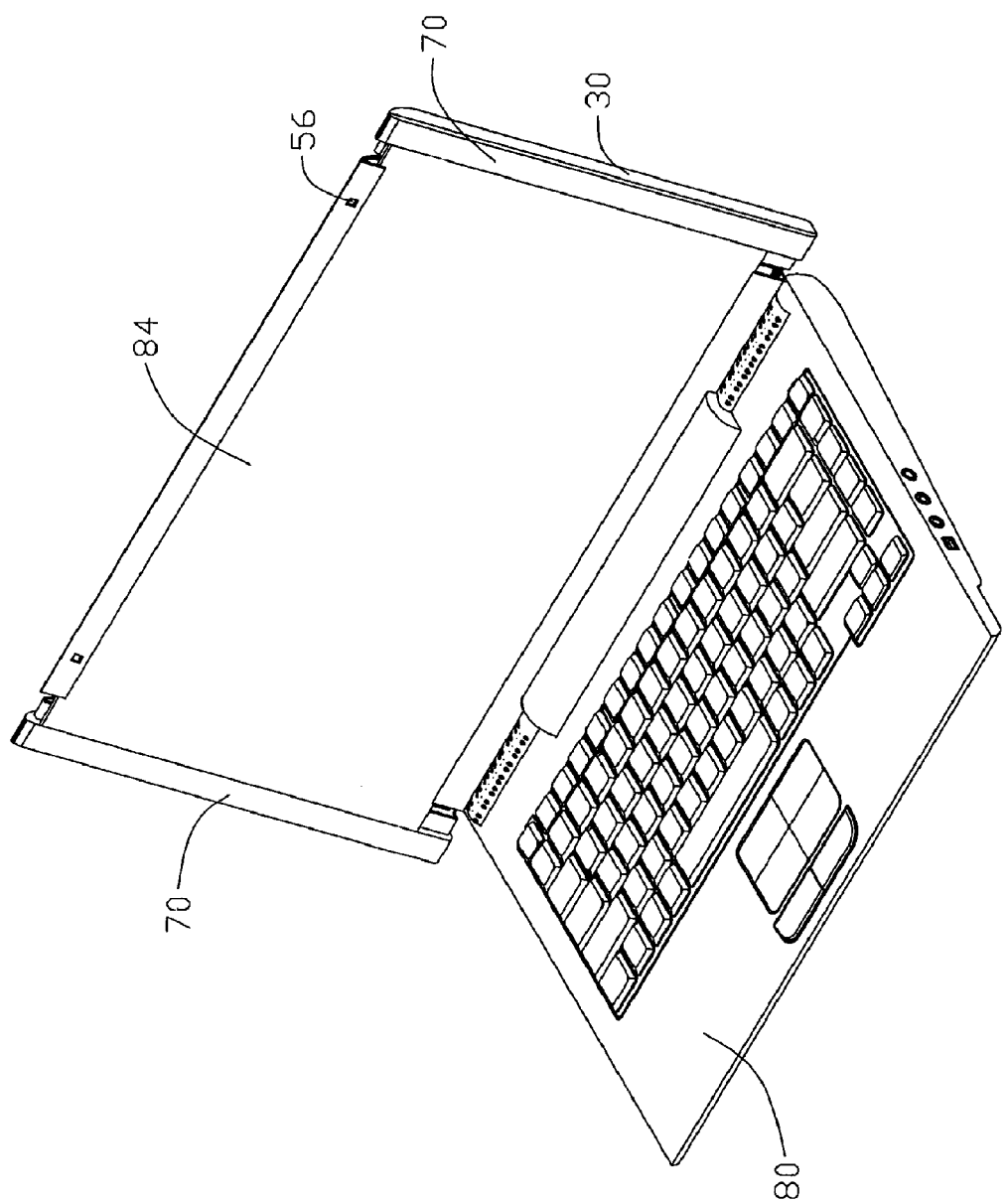

Referring also to FIG. 8, a second larger LCD panel 84 is attached to the mounting apparatus. The handling tab 56 of the actuator 50 is moved to release the post 526 from the second notch 332 and the second resilient member 64 is depressed. The frame 30 is moved leftward, with the first sliding member 33 sliding along the first rails 111 of the bracket 10 and the second sliding member 35 sliding in the third railway of the bracket 10. The hems 316, 317 of the frame 30 slide along lower surfaces of the flanges 131, 132 of the bracket 10, respectively. When the post 526 aligns with the first notch 331 of the frame 30, the handling tab 56 is released so that the post 526 is located in the first notch 331. The second LCD panel 84 is attached to the mounting apparatus, with fasteners engaging with the seats 313 of the frame 30. Then the covering plates 70 are attached to the frames 30 with the hooks 72 engaging in the recesses 312.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mounting apparatus for LCD panels, comprising:
    a bracket;
    a pair of frames attached to the bracket to receive an LCD panel thereon, the frames slidable in a first direction along the bracket, each of the frames comprising at least two spaced notches defined therein, wherein said at least two notches are aligned along the first direction; and
    a pair of actuators attached to the bracket and slidable in a second direction perpendicular to the first direction, each of the actuators comprising a post selectively engaging in one of said notches, thereby selectively positioning the frames at at least two different positions relative to the bracket, to selectively hold LCD panels of different size.

2. The mounting apparatus as claimed in claim 1, wherein the bracket comprises a back wall.

3. The mounting apparatus as claimed in claim 2, wherein the back wall comprises two pairs of first rails extending along the first direction, each of the frames comprises a sliding member sliding along the first rails.

4. The mounting apparatus as claimed in claim 3, wherein said at least two notches are defined in the sliding members respectively.

5. The mounting apparatus as claimed in claim 3, wherein the back wall further comprises a pair of blocks extending therefrom, each of the sliding members and the corresponding block cooperatively hold a resilient member therebetween.

6. The mounting apparatus as claimed in claim 2, wherein the back wall comprises two pairs of second rails extending along the second direction, each of the actuators comprises a pair of channels defined therein sliding along the corresponding second rails.

7. The mounting apparatus as claimed in claim 2, wherein the back wall further comprises a flange extending from an edge of the back wall, a pair of slots is defined in the flange, each of the actuators comprises a handling tab slidably engaging in the corresponding slot.

8. The mounting apparatus as claimed in claim 7, wherein the back wall further comprises a curved portion adjacent the flange, each of the actuators comprises a shaft extending toward the curved portion, a resilient member is fixed around the shaft and movably contacts with the curved portion.

9. The mounting apparatus as claimed in claim 1, wherein each of the frames further comprises a seat defining a threaded hole therein formed at opposite ends thereof.

10. The mounting apparatus as claimed in claim 9, further comprising a pair of covering plates covering the frames.

11. The mounting apparatus as claimed in claim 10, wherein each of the frames defines a pair of recesses in opposite ends thereof, each of the covering plates comprises a pair of hooks formed at two ends thereof to engage with the hooks.

12. A mounting apparatus for LCD panels, comprising:
    a bracket comprising at least one pair of rails in a first direction;
    a pair of frames attached to the bracket for holding an LCD panel thereon, at least one of the frames comprising a sliding member engagingly sliding along said first pair of rails, wherein the sliding member defines at least two spaced notches aligned along the first direction;
    at least one actuator slidably attached to the bracket and comprising a post selectively engaging in one of said notches in response to the sliding member sliding along the said first pair of rails.

13. The mounting apparatus as claimed in claim 12, wherein the bracket further comprises at least one block, said sliding member and the said block cooperatively hold a resilient member therebetween.

14. The mounting apparatus as claimed in claim 12, wherein the bracket comprises a back wall, and a flange extending from an edge of the back wall, at least one slot is defined in the flange, said actuator comprises a handling tab slidably engaging in said slot.

15. The mounting apparatus as claimed in claim 13, wherein the back wall further comprises a curved portion adjacent the flange, said actuator comprises a shaft extending toward the curved portion, a resilient member is fixed around the shaft and movable contacts with the curved portion.

16. The mounting apparatus as claimed in claim 12, further comprising a pair of covering plates covering the frames, each of the frames further comprises a pair of seats defining a threaded hole therein formed at opposite ends thereof.

17. The mounting apparatus as claimed in claim 12, wherein the bracket comprises at least one pair of second rails extending along the second direction perpendicular to the first direction, said at least one actuator engagingly sliding along said pair of second rails.

18. The mounting apparatus as claimed in claim 17, wherein said at least one actuator defines a pair of channels, said pair of second rails slidably engage in the channels, respectively.

* * * * *

UNITED STATES PATENT AND TRADEMARK OFFICE
CERTIFICATE OF CORRECTION

| | | |
|---|---|---|
| PATENT NO. | : 7,595,979 B2 | Page 1 of 1 |
| APPLICATION NO. | : 11/309410 | |
| DATED | : September 29, 2009 | |
| INVENTOR(S) | : Shi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 459 days.

Signed and Sealed this

Twenty-eighth Day of September, 2010

David J. Kappos
*Director of the United States Patent and Trademark Office*